United States Patent [19]

Halasa et al.

[11] Patent Number: 4,618,650
[45] Date of Patent: Oct. 21, 1986

[54] SILOXANE CONTAINING NETWORK POLYMER

[75] Inventors: Adel F. Halasa, Bath; George Jalics, Akron, both of Ohio

[73] Assignee: The Goodyear Tire & Rubber Company, Akron, Ohio

[21] Appl. No.: 772,484

[22] Filed: Sep. 4, 1985

[51] Int. Cl.$^4$ .............................................. C08F 8/00
[52] U.S. Cl. ................................... 525/105; 525/106; 525/342
[58] Field of Search ....................... 525/105, 106, 342

[56] References Cited

U.S. PATENT DOCUMENTS

| | | | |
|---|---|---|---|
| 3,624,014 | 8/1968 | Moore et al. | 525/105 |
| 3,644,315 | 2/1972 | Gardner et al. | 525/105 |
| 3,655,598 | 4/1972 | Antonen et al. | 525/105 |
| 4,507,437 | 3/1985 | Kato et al. | 525/106 |

*Primary Examiner*—Melvyn I. Marquis
*Attorney, Agent, or Firm*—Alvin T. Rockhill

[57] ABSTRACT

Metals from groups I and II are commonly used to catalyze the polymerization of monomers into polymers. The polymers formed in such polymerizations are terminated with the metal used to catalyze the polymerization and are sometimes referred to as living polymers. Such polymers can be crosslinked to produce a polymeric network by utilizing the process of the present invention. More specifically, the present invention discloses a process for endlinking a living polymer comprising reacting the living polymer which is metal terminated with a halogenated silicon containing compound to produce a polymer which is terminated with halogenated silicon moieties; followed by reacting that polymer with a tertiary alcohol to produce a polymer which is terminated with hydroxy silyl moieties. The polymer which is terminated with hydroxy silyl moieties can then be endlinked into a network polymer that contains siloxane linkages by simply heating it.

19 Claims, No Drawings

SILOXANE CONTAINING NETWORK POLYMER

BACKGROUND OF THE INVENTION

Metals from groups I and II are commonly used to catalyze the polymerization of monomers into polymers. For example, lithium, barium, magnesium, sodium, and potassium are metals that are frequently utilized in such polymerizations. Catalyst systems of this type are of commercial importance because they can be used to produce stereoregulated polymers. For instance, lithium catalysts can be utilized to catalyze the anionic polymerization of isoprene into cis-1,4-polyisoprene.

The polymers formed in such polymerizations are terminated with the metal used to catalyze the polymerization and are sometimes referred to as living polymers. They are referred to as living polymers because the polymer chains which are terminated with the metal catalyst continue to grow or live until all of the available monomer is exhausted. Polymers that are prepared by utilizing such metal catalysts have structures which are essentially linear. Such polymers have structures that do not contain appreciable amounts of branching. Rubbery polymers of this type have certain drawbacks in that their flow characteristics at room temperature are extremely high and in that their tensile strength and tear resistance in the unvulcanized state are very poor due to less chain entanglement among their molecular chains. Due to these characteristics, the processing of such rubbery polymers prior to vulcanization is sometimes difficult. In order to improve the cold flow characteristics, tensile strength, and tear resistance of such unvulcanized rubbers they are often crosslinked prior to processing and subsequent vulcanization. Such metal terminated rubbery polymers have been crosslinked by treatment with divinylbenzene or tin halides. The use of such chemical agents in effect endlinks the polymer chains.

It is also known in the art that metal terminated polymers can be endlinked by treating them with a stoichiometric amount of silicon tetrachloride. The endlinking of a lithium terminated polymer with silicon tetrachloride is illustrated in the following reaction scheme:

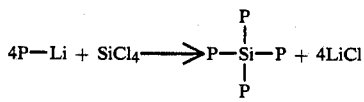

wherein P represents polymer chains. As can be seen one mole of silicon tetrachloride is required for every four moles of lithium terminated polymer chains. In other words, one mole of silicon tetrachloride is required for every four moles of lithium in the lithium terminated polymer being treated. This relationship must be stoichiometrically perfect in order to endlink every lithium terminated polymer chain in the polymer being treated. This is because, if too much (more than a stoichiometric amount) of silicon tetrachloride is utilized the polymer chains can react with the silicon tetrchloride to become terminated with a chlorinated silicon moiety without being endlinked. Such unbranched polymer chains have the structural formula:

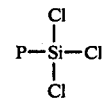

Such silicon trichloride terminated polymer chains will not react with each other to become endlinked.

Due to the fact that the amount of silicon trichloride needed to endlink a metal terminated polymer must be stoichiometrically perfect in order to maximize the endlinking of such polymers it is virtually impossible to endlink 100 percent of the metal terminated polymer chains in a polymer by utilizing silicon tetrachloride as the crosslinking agent. Another drawback associated with utilizing silicon halides as crosslinking agents is that a maximum of four polymer chains can be endlinked together in each polymer network formed.

SUMMARY OF THE INVENTION

The present invention discloses a process for endlinking metal terminated polymers wherein a molar excess of the crosslinking agent can be utilized without maintaining a perfect stoichiometric relationship in order to attain maximum crosslinking. The utilization of this technique can also result in the formation of huge polymeric networks which can theoretically contain an infinite number of polymer chains.

More specifically, the present invention reveals a process for endlinking a metal terminated polymer comprising:

(a) reacting the metal terminated polymer with a molar excess of a halogenated silicon containing compound, wherein the halogenated silicon containing compound contains at least two halogen atoms which are bonded directly to a silicon atom, to produce a polymer which is terminated with halogenated silicon moieties wherein the halogenated silicon moieties contain at least one halogen atom which is bonded directly to a silicon atom;

(b) reacting the polymer which is terminated with halogenated silicon moieties with a molar excess of a tertiary alcohol to produce a polymer which is termiated with hydroxy silyl moieties; and (c) allowing the polymer which is terminated with the hydroxy silyl moieties to endlink under conditions sufficient to produce a network polymer containing siloxane linkages.

The present invention also discloses a process for endlinking a metal terminated polymer comprising:

(a) reacting the metal terminated polymer with a molar excess of a halogenated silicon containing compound having the structural formula

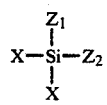

wherein X represents a halogen and wherein $Z_1$ and $Z_2$ can be the same or different and are selected from the group consisting of halogens and alkyl groups, to produce a polymer which is terminated with halogenated silicon moieties, wherein the halogenated silicon moieties have the structural formula

wherein X represents a halogen and wherein $Z_1$ and $Z_2$ can be the same or different and are selected from the group consisting of halogens and alkyl groups;

(b) reacting the polymer which is terminated with halogenated silicon moieties with a molar excess of a tertiary alcohol to produce a polymer which is terminated with hydroxy silyl moieties, wherein the hydroxy silyl moieties have the structural formula

wherein $A_1$ and $A_2$ can be the same or different and are selected from the group consisting of alkyl groups and hydroxyl groups; and (c) allowing the polymer which is terminated with the hydroxy silyl moieties to endlink under conditions sufficient to produce a network polymer containing siloxane linkages. The network polymer formed is usually the reaction product of one or more polymers which are comprised of polymer chains which are terminated with at least one moiety which has a structural formula selected from the group consisting of

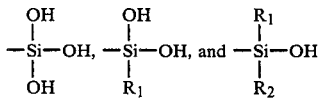

wherein $R_1$ and $R_2$ are alkyl moieties which can be the same or different.

DETAILED DESCRIPTION OF THE INVENTION

The process of the present invention can be used to endlink any polymer which is terminated with a metal of group I or II of the periodic table. These polymers can be produced utilizing techniques that are well known to persons skilled in the art. The catalyst used in catalyzing the polymerization utilized in producing such polymers is most commonly selected from the group consisting of barium, lithium, magnesium, sodium, and potassium. Lithium and magnesium are the metals that are most commonly utilized in the synthesis of such metal terminated polymers (living polymers). U.S. Pat. No. 4,048,420, which is incorporated herein by reference in its entirety, describes the synthesis of a lithium terminated catalyst which is catalyzed with very finely divided lithium having an average particle diameter of less than 2 microns.

The metal terminated polymers to which the present invention pertains have the general structural formula P-M, wherein P represents a polymer chain and wherein M represents a metal of group I or II. The metal catalysts utilized in the synthesis of such metal terminated polymers are very commonly in the form of organometallic compounds. For instance, lithium is commonly utilized to catalyze such polymerizations in the form of an organolithium compound. Such organolithium compounds generally have the structural formula LiR, wherein R represents an alkyl group containing from 1 to 20 carbon atoms. More commonly, the alkyl group in such alkyl lithium compounds will contain from 2 to 8 carbon atoms. For instance, butyl lithium is very commonly utilized as a catalyst in such polymerizations.

Many types of unsaturated monomers which contain carbon-carbon double bonds can be polymerized into polymers using such metal catalysts. Elastomeric or rubbery polymers can be synthesized by polymerizing diene monomers utilizing this type of metal catalyst system. The diene monomers that can be polymerized into synthetic rubbery polymers can be either conjugated or nonconjugated dienes. Vinyl-substituted aromatic monomers can also be copolymerized with one or more diene monomers into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

Metal terminated polymers are generally prepared in solution polymerizations which utilize a saturated aliphatic hydrocarbon or an aromatic hydrocarbon as the solvent. Such polymerizations result in the formation of a polymer cement (a highly viscous solution of the polymer). The process of this invention can be utilized to endlink metal terminated polymers while they are still in the polymer cement. In fact, it is preferable to endlink such metal terminated polymers into a polymeric network while they are still in solution. However, metal terminated polymers can also be endlinked utilizing the process of the present invention in bulk (as dry polymers). For example, dry metal terminated polymers can be endlinked in a Banbury mixer utilizing the process of the present invention. Metal terminated polymers which have previously been crosslinked with agents such as divinylbenzene can also be endlinked by utilizing the process of this invention.

Metal terminated polymers can be crosslinked into network polymers utilizing the process of the present invention by first treating the metal terminated polymer with a halogenated silicon containing compound, such as silicon tetrachloride or silicon tetrabromide. These halogenated silicon containing compounds contain at least two halogen atoms which are bonded directly to one or more silicon atoms. Such halogenated silicon containing compounds generally have a structural formula selected from the group consisting of

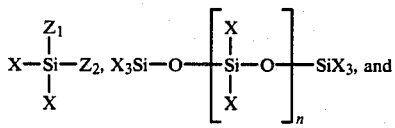

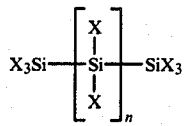

wherein X represents a halogen atom, wherein $Z_1$ and $Z_2$ can be the same or different and are selected from the group consisting of halogen atoms and alkyl groups and wherein n represents an integer from 1 to 20. The halogenated silicon containing compound will most commonly have the structural formula

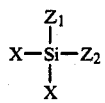

wherein X represents a halogen atom and wherein $Z_1$ and $Z_2$ can be the same or different and are selected from the group consisting of halogens and alkyl groups. The alkyl groups in such halogenated silicon containing compounds normally contain from 1 to 20 carbon atoms and will usually contain from 1 to 8 carbon atoms. Most preferably $Z_1$ and $Z_2$ will represent halogen atoms. Chlorine and bromine are preferred halogen atoms with chlorine being the most preferred.

This treating process can be done by simply mixing the halogenated silicon containing compound into a solution containing the metal terminated polymer being treated. In other words, the halogenated silicon containing compound utilized can be mixed into a polymer cement containing the metal terminated polymer. This step in the process of this invention can also be done by mixing the halogenated silicon containing compound into a dry metal terminated polymer. For example, the halogenated silicon containing compound could be distributed throughout a dry metal terminated polymer in a mill mixer or in a Banbury mixer. A molar excess of the silicon tetrahalide is utilized in this step of the process. In other words, more than a stoichiometric amount of the halogenated silicon containing compound is reacted with the metal terminated polymer being treated. It is generally preferred for a molar excess of the halogenated silicon containing compound of 200% to 2000% to be utilized in this step of the process. It is normally more preferred for a molar excess of 400% to 1000% of the halogenated silicon containing compound to be utilized. For example, it is preferred for 1 mole to 2½ moles of silicon tetrachloride to be utilized for every mole of lithium end groups in the polymer being endlinked. The temperature at which this step of the process is carried out is not particularly critical. However, it will generally be carried out at a temperature of 0° C. to about 150° C. Most commonly this step of the process will be done at ambient temperature. During this step of the process the halogenated silicon containing compound reacts with the metal terminated polymer so as to produce a polymer which is terminated with halogenated silicon moieties wherein the halogenated silicon moieties contain at least one halogen atom which is bonded directly to a silicon atom. For example, such halogenated silicon moieties can have the structural formula

wherein X represents a halogen and wherein $Z_1$ and $Z_2$ can be the same or different and are selected from the group consisting of halogens and alkyl groups.

In the second step of the process of the present invention, the polymer which is terminated with halogenated silicon moieties (which was produced in the first step) is reacted with a molar excess of a tertiary alcohol to produce a polymer which is terminated with hydroxy silyl moieties. These hydroxy silyl moieties contain at least one hydroxy group which is bonded directly to a silicon atom. For example, such hydroxy silyl moieties can have the structural formula

wherein $A_1$ and $A_2$ can be the same or different and are selected from the group consisting of alkyl groups and hydroxyl groups. It is generally preferred for there to be a molar excess of the tertiary alcohol of 200% to 2000% with it being more preferred for this molar excess to range between 400% and 1000%. The temperature at which this step of the process is carried out is again not very critical. However, it will normally be convenient to conduct this step of the process at a temperature between 0° C. and 150° C. Normally this step in the process will be conducted at ambient temperature. The tertiary alcohols that can be used will normally contain from 4 to 20 carbon atoms and the tertiary alcohols that are preferred contain from 4 to 8 carbon atoms.

In the final step of the process of this invention the hydroxy silyl terminated polymer formed in the second step is allowed to endlink at a temperature between about 10° C. and 150° C. In this step of the process the hydroxy silyl terminated polymer is endlinked which results in the formation of a polymeric network or star polymer containing siloxane linkages. This step of the process can be carried out without utilizing any catalyst at a temperature of 80° C. to 150° C. It will preferably be conducted at a temperature of 110° C. to 140° C. and will most preferably be conducted at a temperature of 125° C. to 135° C. This step in the process can be carried out at lower temperatures if a catalyst is utilized. It is believed that organic diamines having the structural formula

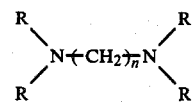

wherein R is an alkyl group containing from 1 to 3 carbon atoms and wherein n is an integer from 1 to 4 inclusive can be utilized as such a catalyst. Some representative examples of some suitable catalysts of this type include:

N,N,N',N'-tetramethylmethanediamine,
N,N-dimethyl-N'N'-diethyl-1,2-ethanediamine,
N,N,N',N'-tetramethyl-1,2-ethanediamine,
N,N,N',N'-tetraethyl-1,2-ethanediamine,
N,N,N',N'-tetramethyl-1,3-propanediamine, and
N,N,N',N'-tetramethyl-1,4-butanediamine. A particularly preferred catalyst is
N,N,N',N'-tetramethyl-1,2-ethanediamine.

As a sepcific example of the process of the present invention a lithium terminated polymer can be reacted with a molar excess of silicon tetrachloride at room temperature according to the reaction:

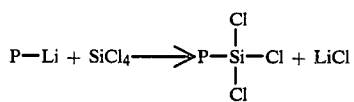

wherein P represents a polymer chain. The polymer produced in the first step of the process can then be further reacted with a molar excess of tertiary butyl alcohol according to the reaction:

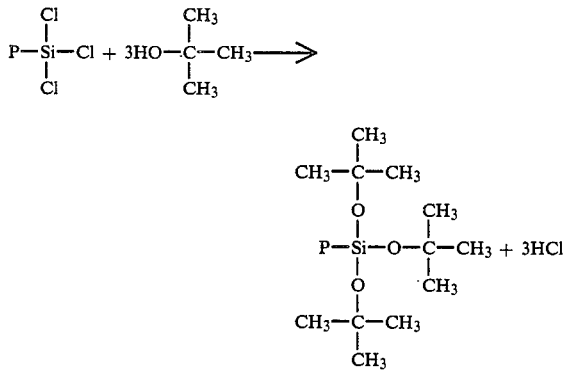

wherein P again represents a polymer chain. The polymer that results from this step of the process can then be heated at a temperature of about 130° C. which results in it decomposing into a polymer that is terminated with a hydroxy silyl moiety and results in the formation of 2-methylpropene as a byproduct according to the reaction:

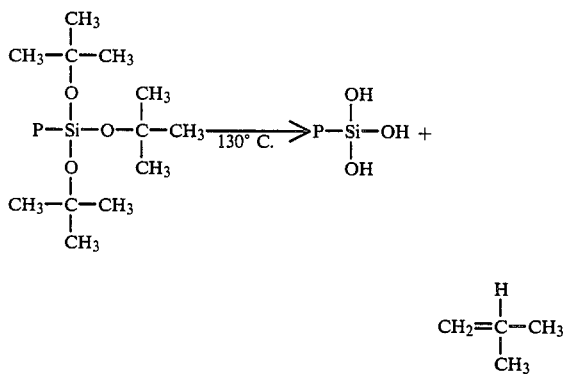

As the hydroxy silyl terminated polymer is further heated it endlinks with other hydroxy silyl polymers to form a polymeric network which is crosslinked with siloxane linkages according to the reaction:

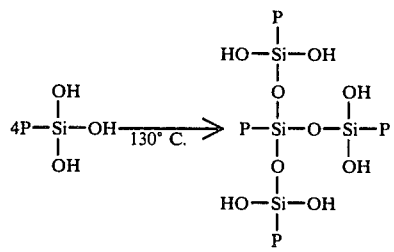

The unreacted hydroxy groups in the polymer network produced can further react with other hydroxy silyl terminated polymers which will further increase the size of the polymeric network. In fact, the ability of such a polymeric network to further react with additional hydroxy silyl terminated polymers forming larger and larger polymeric networks is theoretically unlimited.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

Butadiene was polymerized into polybutadiene having a molecular weight of 60,000 to 100,000 utilizing a lithium catalyst system. The solvent utilized in this solution polymerization technique was hexane and the polymerization temperature utilized was 30° C. to 50° C. The polymer cement formed contained 15% living polybutadiene.

A 300% molar excess of silicon tetrachloride was added to the polybutadiene cement formed. A temperature of 25° C. was maintained for a reaction time of 30 minutes. The polymer cement was then treated with a molar excess of tertiary-butyl alcohol. The temperature was maintained at 25° C. for this treatment. The polymer cement was then heated to 100° C. for 16 hours. It was determined that the polymer formed was 82% branched with a substantial majority of the star-branched polymer formed being tribranched, tetrabranched, or containing 5 or more branches.

COMPARATIVE EXAMPLE 1

The process utilized in Example 1 was repeated in this comparative example except that the polymer was not heated after the treatment with the tertiary butyl alcohol. In this experiment it was determined that the polymer was 68% branched. This example clearly shows that the subsequent heat treatment provided in Example 1 resulted in additional crosslinking.

EXAMPLE 2

Butadiene was polymerized into polybutadiene having a molecular weight of about 145,000 and a vinyl content of about 53% in hexane utilizing tert-butyl lithium as the initiator and N,N,N',N'-tetramethyl-1,2-ethanediamine as a modifier. The polymer cement formed had a solids content of about 15%.

A 400% molar excess of silicon tetrachloride was added to the polymer cement formed. A temperature of 25° C. was then maintained for a reaction time of 30 minutes. The polybutadiene cement was then treated with a molar excess of tertiary-butyl alcohol. The temperature was maintained at 25° C. for this treatment. It was determined by gel permeating chromatography that the network polymer formed was 69% tetrabranched. It is believed that the N,N,N',N'-tetramethyl-1,2-ethanediamine which was used as a polymerization modifier acted to catalyze the endlinking reaction. Thus, it was not necessary to heat the polybutadiene which was terminated with hydroxy silyl moieties in order to make it endlink. In fact, heating did not cause additional branching.

COMPARATIVE EXAMPLE 2

The procedure specified in Example 1 was repeated in this experiment except that methanol was substituted for the tertiary butyl alcohol utilized in Example 1. It was determined that 56% polymer produced in this process was not endlinked or branched and that the remaining 44% of the polymer was dilinked. This experiment shows that methanol cannot be substituted for a tertiary alcohol in the practice of this invention.

While certain representative embodiments and details have been shown for the purpose of illustrating the present invention, it will be apparent to those skilled in this art that various changes and modifications can be made therein without departing from the scope of the present invention.

What is claimed is:

1. A process for crosslinking a metal terminated polymer comprising:
   (a) reacting the metal terminated polymer with a molar excess of a halogenated silicon containing compound, wherein the halogenated silicon containing compound contains at least two halogen atoms which are bonded directly to a silicon atom, to produce a polymer which is terminated with halogenated silicon moieties wherein the halogenated silicon moieties contain at least one halogen atom which is bonded directly to a silicon atom;
   (b) reacting the polymer which is terminated with halogenated silicon moieties with a molar excess of a tertiary alcohol to produce a polymer which is terminated with hydroxy silyl moieties; and
   (c) allowing the polymer which is terminated with the hydroxy silyl moieties to crosslink under conditions sufficient to produce a crosslinked polymer containing siloxane linkages.

2. A process for crosslinking a metal terminated polymer comprising:
   (a) reacting the metal terminated polymer with a molar excess of a halogenated silicon containing compound having the structural formula

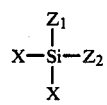

wherein X represents a halogen and wherein $Z_1$ and $Z_2$ can be the same or different and are selected from the group consisting of halogens and alkyl groups, to produce a polymer which is terminated with halogenated silicon moieties, wherein the halogenated silicon moieties have the structural formula

wherein X represents a halogen and wherein $Z_1$ and $Z_2$ can be the same or different and are selected from the group consisting of halogens and alkyl groups;
   (b) reacting the polymer which is terminated with halogenated silicon moieties with a molar excess of a tertiary alcohol to produce a polymer which is terminated with hydroxy silyl moieties, wherein the hydroxy silyl moieties have the structural formula

wherein $A_1$ and $A_2$ can be the same or different and are selected from the group consisting of alkyl groups and hydroxyl groups; and
   (c) allowing the polymer which is terminated with the hydroxy silyl moieties to crosslink under conditions sufficient to produce a crosslinked polymer containing siloxane linkages.

3. A process as specified in claim 2 wherein the molar excess of said halogenated silicon containing compound is a molar excess of 200% to 2000%.

4. A process as specified in claim 3 wherein said crosslinking is conducted at a temperature of from 0° C. to 150° C.

5. A process as specified in claim 4 wherein said tertiary alcohol is tertiary butyl alcohol.

6. A process as specified in claim 5 wherein X represents a halogen selected from the group consisting of chlorine and bromine.

7. A process as specified in claim 6 wherein said alkyl groups contain from 1 to 20 carbon atoms.

8. A process as specified in claim 7 wherein the molar excess of said tertiary alcohol is a molar excess of 200% to 2000%.

9. A process as specified in claim 8 wherein the halogen is chlorine.

10. A process as specified in claim 9 wherein said alkyl groups contain from 1 to 8 carbon atoms.

11. A process as specified in claim 10 wherein the molar excess of said halogenated silicon containing compound is a molar excess of 400% to 1000%.

12. A process as specified in claim 11 wherein $Z_1$ and $Z_2$ represent chlorine atoms and wherein $A_1$ and $A_2$ represent chlorine atoms.

13. A process as specified in claim 12 wherein said metal is lithium.

14. A process as specified in claim 13 wherein said metal terminated polymer is polybutadiene.

15. A process as specified in claim 14 wherein said crosslinking is conducted at a temperature of from 110° C. to 140° C.

16. A process as specified in claim 1 wherein said halogenated silicon containing compound has a structural formula selected from the group consisting

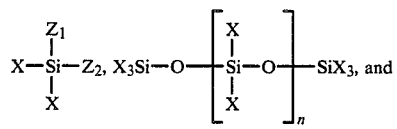

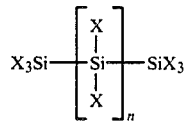

wherein X represents a halogen atom, wherein $Z_1$ and $Z_2$ can be the same or different and are selected from the group consisting of halogen atoms and alkyl groups and wherein n represents an integer from 1 to 20.

17. A crosslinked polymer made by the process specified in claim 1.

18. A crosslinked polymer made by the process specified in claim 2.

19. A crosslinked polymer made by the process specified in claim 13.